[19] United States Patent
Mumford et al.

[11] Patent Number: 4,984,086
[45] Date of Patent: Jan. 8, 1991

[54] SCANNER WITH ELECTRONICALLY VARIABLE RASTER TO PRODUCE PICTURE EFFECTS

[75] Inventors: Ronald W. J. Mumford; Terence W. Mead, both of Hertfordshire, England

[73] Assignee: Rank Cintel Ltd., England

[21] Appl. No.: 471,846

[22] Filed: Jan. 29, 1990

Related U.S. Application Data

[63] Continuation-in-part of Ser. No. 164,523, Mar. 7, 1988, Pat. No. 4,897,729, which is a continuation-in-part of Ser. No. 940,562, Dec. 11, 1986, Pat. No. 4,746,985, which is a continuation-in-part of Ser. No. 722,153, Apr. 11, 1985, Pat. No. 4,694,345.

[30] Foreign Application Priority Data

Dec. 22, 1989 [GB] United Kingdom ............... 8928991

[51] Int. Cl.⁵ ......................................... H04N 3/36
[52] U.S. Cl. ..................................... 358/216; 358/214
[58] Field of Search ............................. 358/214–216, 358/54, 162, 209

[56] References Cited

U.S. PATENT DOCUMENTS

| | | | |
|---|---|---|---|
| 3,979,556 | 9/1976 | Vidal | 358/216 |
| 4,272,780 | 6/1981 | Belmares-Sarabia et al. | 358/214 |
| 4,312,017 | 1/1982 | Poetsch | 358/214 |
| 4,418,360 | 11/1983 | Glasgow | 358/214 |
| 4,485,406 | 11/1984 | Browstein | 358/214 |
| 4,660,091 | 4/1987 | Nutting | 358/214 |

Primary Examiner—Stephen Brinich
Attorney, Agent, or Firm—Ostrolenk, Faber, Gerb & Soffen

[57] ABSTRACT

In a flying spot telecine used to generate video signals by scanning a film, the scanning raster is adjustable angularly relative to the film being scanned. The output video signal hence represents the image on the film but angularly displaced relative to the orientation of the film itself. Using this method angular and rotational picture effects can be generated without the need for expensive computer memory or complex processing of picture information. The method can be applied to produce similar angular and rotational effects in a film writer. In such a system, unexposed film is repeatedly scanned by the flying spot scanner, the beam of which is modulated in turn by R, G and B video signals.

18 Claims, 3 Drawing Sheets

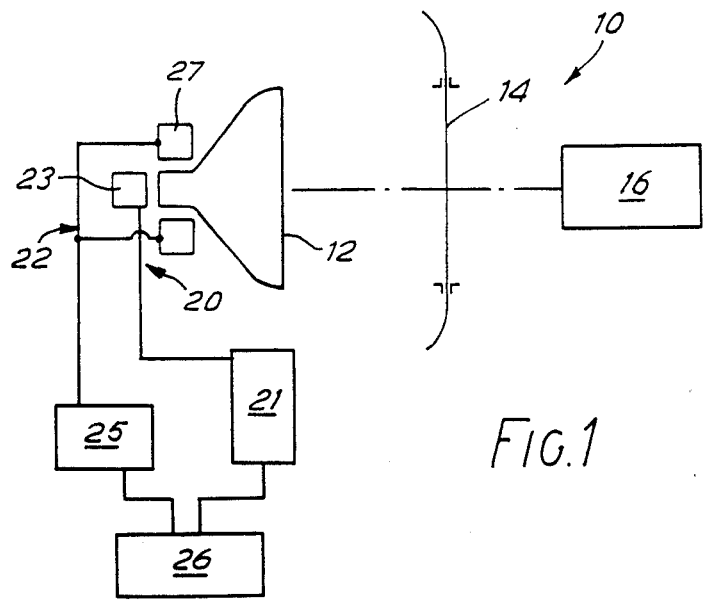
FIG.1
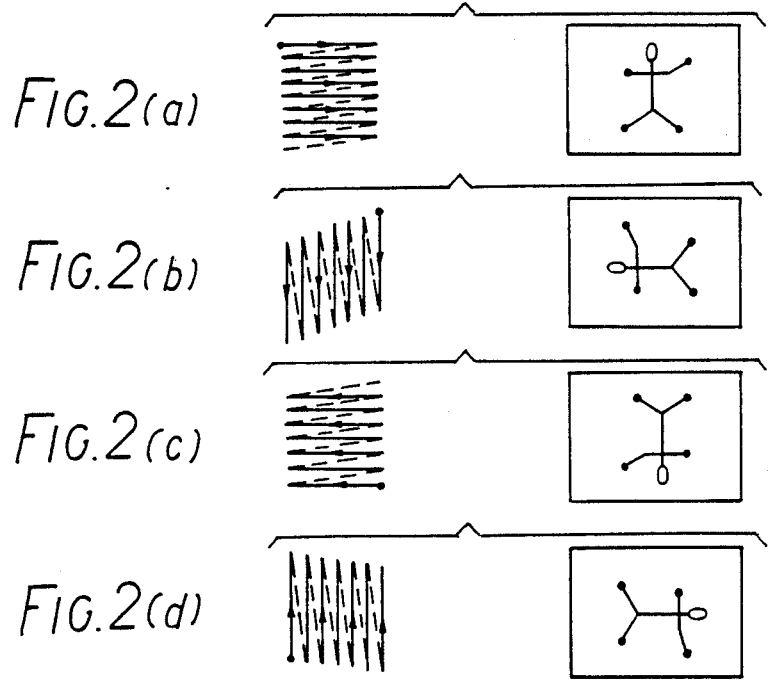
FIG.2(a)
FIG.2(b)
FIG.2(c)
FIG.2(d)

SCANNER WITH ELECTRONICALLY VARIABLE RASTER TO PRODUCE PICTURE EFFECTS

RELATED APPLICATIONS

This application is a continuation-in-part of application Ser. No. 164,523 now U.S. Pat. No. 4,897,729 filed on Mar. 7th 1988 which is a continuation-in-part of application Ser. No. 940,562 now U.S. Pat. No. 4,746,985 filed on Dec. 11th 1986 which is a continuation-in-part of application Ser. No. 722,153 now U.S. Pat. No. 4,694,345 filed Apr. 11th 1985.

BACKGROUND OF THE INVENTION

The present invention relates to a method and apparatus for producing picture effects by means of a flying spot scanner, for example in a telecine apparatus. In particular, it relates to the provision of angularly displaced or rotating effects. The invention also relates to the production of such effects in a film writer; that is an apparatus which writes images onto film from video signals using a flying spot scanner.

Hitherto, where it has been desired to give the impression of a rotating picture on a television screen or to display an image at an angle to the true orientation of the image on the film scanned by the telecine, this has been achieved by writing a digitised picture information into computer memory pixel-by-pixel. The stored picture information, when complete, is read from the memory under computer control in a different order to that in which it was read in. The controlling computer chooses the sequence of memory addresses and, hence, the order in which the stored pixels are read and displayed. A great many picture effects, including angular and rotary effects can be achieved using such computer based digital techniques. However, these techniques are costly since the volume of memory required is great and complex interpolation is required to generate pixels for positions which are not exactly represented by the stored digital information.

We have appreciated that existing flying spot telecine apparatus may be modified for use as a film writer in which video signals are converted into images on photographic film. Furthermore, we have appreciated that the effects referred to above are also desirable in a film writer and that at present they are subject to the same disadvantages as to cost, complexity and accuracy.

It is an object of the invention to provide a method and apparatus by means of which rotating or angular picture effects may be produced without the need for costly computer memory or complex control programs.

It is a further object of the invention to provide a method and apparatus by which rotating or angular picture effects may be produced in a flying spot film writer.

SUMMARY OF THE INVENTION

In a first aspect, the invention provides a method of generating a video signal representing an image on a transparent film portion by scanning said film portion in a raster-scanning telecine. The raster of said telecine is adjustable to vary the angle of the raster relative to the film portion so that the video signal represents the image angularly displaced relative to the film portion. Preferably, the angle of the raster is continuously variable so that the video signal may represent the image undergoing rotational motion relative to the film portion.

Using the method of the invention, a video signal representing an angularly displaced or rotating picture is generated directly by the telecine and can be transmitted to remote receivers without the need for complex computer controlled processing as has hitherto been required.

In a second aspect, the invention provides a telecine for generating a video signal representing an image on a transparent film portion. The telecine comprising scanning means for scanning the image with a scanning raster and control means operable to vary the angle of the raster relative to the film portion so that the video signal represents the image angularly displaced relative to the film portion. Preferably, the control means is operable to vary the angle of the raster continuously so that the video signal represents the image undergoing rotational motion relative to the film portion. In a preferred embodiment the scanning means includes horizontal and vertical scan amplifiers and coils for generating the raster. Both the vertical and horizontal scan amplifiers and coils are capable of scanning at a rate sufficient to provide the horizontal scan for generating video signals for use in conventional television systems.

In a third aspect, the invention provides a method of exposing a film to provide an image corresponding to an image represented by a video signal by scanning the unexposed film with a raster scanner whose scanning beam is controlled by the video signal.

A fourth aspect of the invention applies the method and apparatus of the first and second aspects of the invention to the method of exposing of the third aspect of the invention and to an apparatus for converting video signals into images exposed on photographic film.

BRIEF DESCRIPTION OF THE DRAWINGS

FIG. 1 is a schematic diagram of a flying spot telecine in accordance with the invention; and FIGS. 2a-2d illustrate the effects achieved by rotating the scanning raster in the telecine of FIG. 1;

DETAILED DESCRIPTION OF PREFERRED EMBODIMENTS

Figure 3:
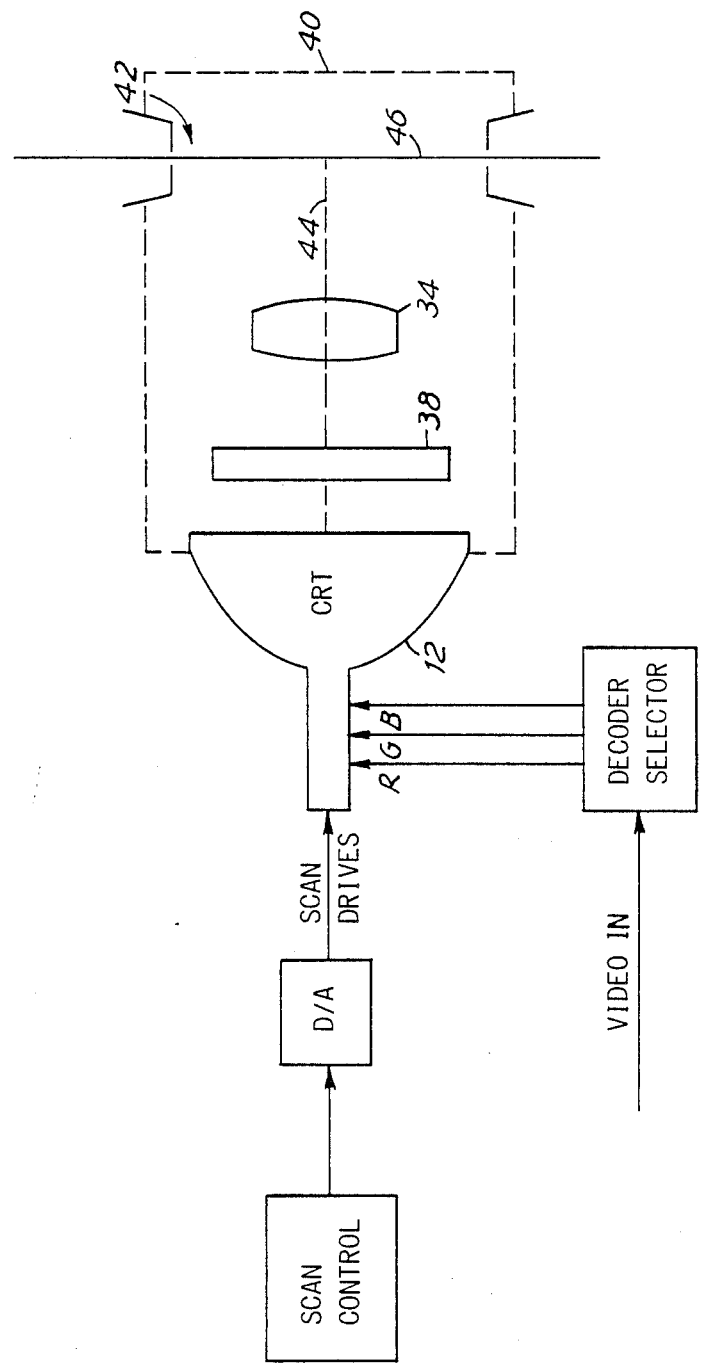
FIG. 3 is a schematic diagram of a flying spot telecine arranged to operate as a film writer.

A telecine apparatus 10 shown in FIG. 1 is a flying spot telecine comprising cathode ray tube (CRT) scanning means 12, a film gate 14 through which the film to be scanned passes continuously, and a photodetector 16 into which light from the CRT scanning means 12 transmitted by the film is focussed by an appropriate lens arrangement (not shown). The output signal from the photodetector 16 is processed by conventional means and, eventually, transmitted as a video signal to remote television receivers.

The scanning raster followed by the flying spot of the CRT scanning means 12 is generated by horizontal and vertical deflection means 20 and 22 respectively.

The horizontal deflection means 20 is not of the type conventionally used to provide a horizontal scan in flying spot telecine apparatus. That is to say, it comprises a linear amplifier 21 driving a low impedance deflection coil 23. This arrangement is capable of driving the CRT electron beam at speeds sufficiently high to permit scanning at the high frequencies employed in current television systems in the Unites States of America.

In conventional telecine apparatus, the vertical deflection means 22 would comprise a linear amplifier 23 driving a deflection coil 27. However, in conventional telecine apparatus, the vertical deflection coil 27 is generally of much higher impedance than the horizontal deflection coil 23, since the vertical deflection means need only drive the CRT flying spot at rates up to about 60 Hz. However, in the telecine apparatus 10 of the invention, the vertical deflection coil 27 is of low impedance similar to that of the horizontal deflection coil 23. Similarly, the vertical deflection amplifier is identical to the horizontal deflection amplifier 21. The reason for this will become apparent from the description which follows.

We have recognised that rotating an angular picture effect on the television screen can be achieved by rotating or angularly displacing the scanning raster generated in the CRT scanning means 12 so that the picture information generated at the output of the photodetector 16 can be transmitted to remote television receivers without complex processing to re-order the picture information.

This is illustrated in FIG. 2 of the drawings.

In FIG. 2a, the scanning raster shown at the left hand side of the drawing is oriented in a conventional manner. That is to say, the scanning raster commences at the top left and continues horizontally until it reaches the end of the line. The flying spot then returns rapidly to the left hand end of the next successive line. The image which appears at a television set receiving the video signal generated by the telecine 10 displays the image in an upright position. In FIG. 2c, the scanning raster is inverted, that is, the raster commences at the bottom right and scans a single line from right to left before flying back to the next line which is positioned above rather than below the proceeding line. The image produced at the screen while the scanning raster occupies this orientation is inverted.

FIGS. 2b and 2d illustrate the intermediate positions between the upright orientation of FIG. 2a and the inverted orientation of FIG. 2c, that is, rotation through 90° and through 270°, respectively. It will be noted that in FIGS. 2b and 2d, successive lines of the scanning raster are offset to compensate for the movement of the film through the film gate 14 of the telecine 10. Similarly, the lengths of the lines of the scanning raster are adjusted in the 90° and 270° orientations to adjust for the film movement.

Although the scanning raster is shown in FIG. 2 oriented at 90° intervals, the rotation may be gradual, occuring over several seconds. This can be achieved by adding or subtracting progressively more of the horizontal drive waveform to the vertical deflection means 22 and similarly more of the vertical drive waveforms to the horizontal deflection means 20. The application of the drive waveforms to the horizontal and vertical deflection means 20 and 22 may be performed under the control of a programmable control means 26. The programmable control means 26 is preferably such that the angle of the scanning raster is variable on a frame-by-frame basis or seam by seam or any multiple of frames basis to provide the desired effect. For example by increasing the angle of the scanning raster by a predetermined amount each frame, the image can be made to appear to rotate. The speed of rotation can be varied by altering the angular change per between each frame and the next. Alternatively, an oscillating effect can be achieved by alternating the angular displacement of successive frames. By suitable programming, the control means 26 can be made to produce a wide range of differing effects at will.

The control means 26 will also control the line offset of any given scanning raster, and the line length so as to compensate both for film movement and to maintain the correct aspect ration for the image produced from the video signal output from the photodetector 16.

Rotation of the scanning raster can be achieved only in telecine equipment in which the vertical deflection means 22 and horizontal deflection means 20 are each capable of providing scanning rates appropriate to the line scan as well as the frame scan it provides in the conventional manner.

It will be appreciated by those skilled in the art that where a picture store is provided to enable a range of film speeds to be accomodated, the same store can be used to provide an output signal in which alternate lines are reversed simply by reversing the order in which data is read out of the store. With such an arrangement, the scanning speeds achievable by the deflection means can be reduced since there is no need to allow for flyback time.

The control can vary the aspect ratio at will such that the rotating pictures can be reduced or increased in size. Similarly, the centre of rotation can be repositioned. A range of other effects can be achieved when using linear amplifiern by changing scan sizes and start and stop provisions. These include horizontal or vertical shifts, changes in amplitude in the horizontal and vertical directions, distortion of linearity, along elipses or curves generally, perspective effects and trapezoids.

Turning now to FIG. 3 there is illustrated schematically a film writer for converting video signals to images on photographic film. The film writer shown may be produced by converting existing flying spot telecines and operates on a non-real time basis.

For the purposes of this description the case will be considered where the video signal to be written onto cinematographic film is produced itself from a telecine.

A flying spot telecine such as that marketed by the applicants under the trademark URSA produces a good quality 625 line digital colour video signal which can be used for monitoring purposes. The signal is formed sequentially prior to being held in a frame store and it is this sequential signal whose horizontal and vertical resolution is increased.

Initially the vertical resolution is increased by repeating the frame scan with the scanning image displaced by ¼ line. This process is repeated a further two times and the horizontal resolution is then increased by repeating each of the four frame scans with the scanning image displaced by ¼ pixel each time. The result is 16 frame scans for film frame. The mechanism to implement the scanning shifts to the desired accuracy already exists in the URSA telecine and is described, for example, in our copending application GB No. 8830504 where scan shifting is used to locate blemishes on the CRT face or in the optical path. Suitable timing of the scans may either be implemented in hardware or software.

At this stage editing of the high resolution, high definition video signal may be performed as required.

To write the edited video signal back onto cinematographic film, unexposed film 46 is located into the telecine. It is necessary that the optical path is light tight and this is illustrated in the figure by cover 40 surrounding the film gate 42 and the optical path 44.

Once the film has been located and one frame is in the film gate the film is scanned sequentially 48 times; that is 16 frame scans for each of the three colour signals. To ensure accuracy of registration the system uses that same scanning circuitry and scanning map that was used to produce the frame scans. To produce the correct exposure of the film emulsion, the C.R.T. grid is modulated by the appropriate R, G or B signal with a corresponding colour filter inserted in the optical path. In the embodiment shown a colour filter wheel 38 is provided between the C.R.T. 12 and imaging optics 34 and which is stepped to a new colour every sixteen frame scans.

The system described enables one frame of film to be written every two or three seconds. The film gate is a pin registered intermittent motion gate which is arranged to advance the film by one frame every 48 frame scans. This method of transport ensures the best picture stability.

The system enables a good film contrasst to be obtained as the thick faceplate of the CRT (approx 8.5 cms) reduces flare.

Rather than increasing the resolution four times in each of the vertical and horizontal directions the resolution may be increased to an HDTV standard for equipment compatability. The degree of enhancement of resolution is a matter of choice dependent on the desire for compatability and the resultant quality of written picture on the film.

Rather than scanning the initial picture 16 times using offset horizontal and vertical positioning an alternative method would be to scan four times as many pixels in each line, that is four times resolution to increase the line duration fourfold and scan four times the normal number of lines. This would result in the same 16 fold increse in resolution and provide a 16 fold frame duration. However, it would not be compatible with the existing standard output for monitoring.

In order to produce the effects hitherto described in relation to telecine, the film writer of FIG. 3 is provided with a monitor. This monitor is located so as to be able to see the CRT face and may simply be a viewing aperture.

Alternatively a photomultipler may be arranged looking at the CRT face before the film to be exposed. In this case a simple imaging system provided to focus light onto the photomultiplier. The output of the photomultiplier is then processed into a video signal which is displayed on a monitor screen. However, the output of the video processing is not a conventional format signal as the monitoring must take place at the same rate as the film is scanned. As was mentioned previously, the exposure of the film is a non-real time operation; a non-standard frequency signal is therefore required.

To produce the rotational effect shown in FIG. 2, a slightly different raster scan pattern is required for the phases corresponding to FIGS. 2b and 2d. The complete scan pattern is shown in FIG. 4.

In the telecine example it was assumed that the machine user was a continuous motion telecine. That is, that the exposed film was moving when it was being scanned by the flying spot; such telecines are now widely used. The effect of the movement is that there is a reduced vertical scan amplitude.

Figure 4A:
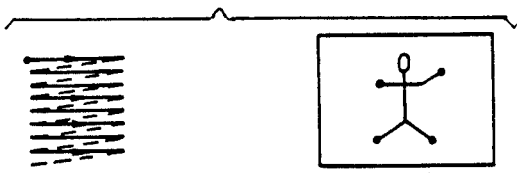
FIGS. 4a-4d are similar to FIGS. 2a-2d showing how the raster may be rotated to produce the effect of FIGS. 2a-2d in a film writer.
Figure 4B:
Figure 4C:
Figure 4D:
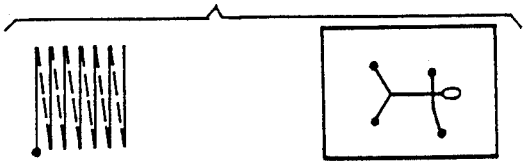

In the film writer described exposure of the film takes place with the film stationary in the film gate; this is necessary as the film is scanned a number of times. If the scan patterns of FIG. 2 were to be applied under these conditions the image would become distorted. In view of this, the scan patterns of FIGS. 4a–d are adopted. Each of the patterns of FIGS. 4b–4d is identical to that of FIG. 4a but rotated through 90°, 180° or 237° respectively. However, the actual line lengths may be varied in order to maintain the correct aspect ratio.

What I claim is:

1. A method for writing an image represented by a video signal onto a portion of unexposed film comprising the steps of:
    introducing a portion of unexposed film into a film gate of a film writer which includes a cathode ray tube (CRT) raster scanner for scanning the film portion;
    scanning said unexposed film portion with said cathode ray tube (CRT) raster scanner;
    controlling the raster in accordance with the video signal representing the image to be written to expose correctly the unexposed film portion; and
    adjusting electronically the angular orientation of the raster of the CRT raster scanner relative to the film portion;
    whereby the orientation on the exposed film of the image written by the CRT scanner under control of the video signal is angularly displaced in accordance with the orientation of the raster.

2. The method set forth in claim 1, wherein the angular orientation of said raster is adjusted over successive frames of film to be written by the CRT raster scanner whereby the images exposed on the successive film frames undergo rotational motion.

3. The method set forth in claim 1, wherein the lengths of the lines of said raster are adjusted to maintain the aspect ratio of the image exposed on the film constant.

4. The method set forth in claim 1, wherein the CRT raster scanner scans the unexposed film portion a plurality of times in any given angular orientation of said scanning raster.

5. The method set forth in claim 4, wherein the CRT raster scanner successively scans the film portion under control of different portions of the video signal during said plurality of scans.

6. The method set forth in claim 5, wherein each portion of the video signal controlling the CRT raster scanner is a color component signal.

7. Apparatus for writing an image represented by a video signal onto a portion of unexposed film comprising:
    a film writer, the film writer including means for introducing said unexposed film portion into a film gate of said film writer, said film writer further comprising a cathode ray tube (CRT) scanner for scanning said film portion in a raster like manner;
    means for controlling the raster of the CRT raster scanner in scanner in accordance with the video signal representing the image to be written; and
    means for adjusting electronically the angular orientation of said scanning raster of said CRT raster scanner relative to the orientation of said film portion; and
    said film writer writing on said film portion an image corresponding to the image represented by the video signal, the orientation of the written image being angularly displaced relative to the film portion.

8. The apparatus set forth in claim 7, wherein said adjusting means varies said angular orientation of successive frames of said film portion exposed in said film gate whereby a series of images exposed on the film portion undergo rotational motion relative to the film portion.

9. The apparatus set forth in claim 8, wherein the adjusting means causes the lengths of said lines of said raster to be adjusted to maintain the aspect ratio of said written image constant.

10. The apparatus set forth in claim 7, wherein said adjusting means includes horizontal and vertical scan amplifiers and coils for generating said raster, both said vertical and said horizontal scan amplifiers and coils being capable of scanning at a rate sufficient to be controlled by video signal used in television systems.

11. The apparatus set forth in claim 7, wherein the CRT raster scanner includes means for scanning a frame of the unexposed film portion introduced into the film gate a plurality of times in any given angular orientation of said raster scanner.

12. The apparatus set forth in claim 11, wherein the means for controlling said raster of the CRT raster scanner comprises means for successively controlling said raster according to different portions of said video signal during said plurality of scans of said frame of said unexposed film portion.

13. The apparatus set forth in claim 12, wherein each of said different portions of said video signal is a color component signal.

14. A method of writing an image represented by a video signal onto an unexposed film portion by scanning said film portion with a cathode ray tube raster scanner, the raster being controlled by the video signal, the angle of said raster of the CRT raster scanner being continuously variable whereby the image exposed on the film portion corresponds to said image represented by said video signal angularly displaced relative to said film portion and over successive frames represents said represented image undergoing rotational motion relative to said film portion.

15. A method of writing an image represented by a video signal onto an unexposed film portion by scanning said film portion with a cathode ray tube (CRT) raster scanner, the raster being controlled by the video signal, said raster of said CRT scanner being adjustable to vary the angle of said raster relative to said film portion, the lengths of the lines of said raster being adjusted to maintain the aspect ratio of said image constant whereby said written image represents said represented image angularly displaced relative to said film portion.

16. A film writer for writing a image represented by a video signal onto an unexposed film portion, said film writer comprising cathode ray tube raster scanning means for scanning said image, control means for controlling the raster of the CRT raster scanner in accordance with said video signal, and variation means operable to vary electronically the angle of the raster relative to said film portion, said variation means being operable to vary said angle of said raster continuously whereby said written image corresponds to said represented image angulary displaced relative to said film portion and successive written images correspond to said represented image undergoing rotational motion relative to said film portion.

17. A film writer for writing an image represented by a video signal onto an unexposed film portion, said film writer comprising cathode ray tube raster scanning means for scanning said image, control means for controlling the raster of the CRT raster scanner in accordance with said video signal, and variation means operable to vary electronically the angle of the raster relative to said film portion, whereby said written image corresponds to said represented image angularly displaced relative to said film portion, said variation means being operable to vary the lengths of the lines of said raster to maintain the aspect ratio of said written image constant.

18. A film writer for writing an image represented by a video signal onto an unexposed film portion, said film writer comprising cathode ray tube raster scanning means for scanning said image, control means for controlling the raster of the CRT scanner in accordance with said video signal, and variation means operable to vary electronically the angle of the raster relative to said film portion, whereby said written image corresponds to said represented angularly displaced image relative to said film portion, said scanning means including horizontal and vertical scan amplifiers and coils for generating said raster, both said vertical and horizontal scan amplifiers and coils being capable of scanning at a rate sufficient to be controlled by video signals used in television systems.

* * * * *